United States Patent
Toews et al.

(10) Patent No.: US 12,475,804 B2
(45) Date of Patent: Nov. 18, 2025

(54) VEHICLE SYSTEMS AND METHODS FOR NONSYNCHRONOUS REDUNDANCY MANAGEMENT

(71) Applicant: HONEYWELL INTERNATIONAL INC., Charlotte, NC (US)

(72) Inventors: Philip Toews, Phoenix, AZ (US); Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 264 days.

(21) Appl. No.: 18/463,721

(22) Filed: Sep. 8, 2023

(65) Prior Publication Data
US 2025/0037585 A1 Jan. 30, 2025

(30) Foreign Application Priority Data
Jul. 25, 2023 (IN) .............................. 202311050000

(51) Int. Cl.
*G08G 5/55* (2025.01)
*G06F 8/65* (2018.01)

(52) U.S. Cl.
CPC ..................................... *G08G 5/55* (2025.01); *G06F 8/65* (2013.01)

(58) Field of Classification Search
None
See application file for complete search history.

(56) References Cited

U.S. PATENT DOCUMENTS

| | | |
|---|---|---|
| 10,295,349 B2 | 5/2019 | Mere |
| 10,616,241 B2 | 4/2020 | Toews |
| 2012/0173052 A1* | 7/2012 | Nicolas .................... G08G 5/34 701/3 |
| 2013/0184899 A1* | 7/2013 | Raynaud .............. G05D 1/0077 701/3 |
| 2017/0343357 A1* | 11/2017 | Mere ........................ B64D 45/00 |
| 2018/0039665 A1* | 2/2018 | Pfeifle ...................... G06F 16/23 |
| 2018/0284812 A1* | 10/2018 | Durand ................... B64D 45/04 |
| 2018/0357030 A1* | 12/2018 | Fairchild ................ G06F 3/1438 |
| 2019/0108760 A1* | 4/2019 | Krishna .................... G08G 5/55 |
| 2020/0005654 A1* | 1/2020 | Mere ......................... G08G 5/34 |
| 2020/0111371 A1* | 4/2020 | Roger ....................... G08G 5/55 |
| 2020/0320884 A1 | 10/2020 | Hillier et al. |

(Continued)

FOREIGN PATENT DOCUMENTS

| CN | 108363644 A | 8/2018 |
|---|---|---|
| EP | 2818956 B1 | 3/2019 |

(Continued)

*Primary Examiner* — Amelia Vorce
(74) *Attorney, Agent, or Firm* — Ingrassia Fisher & Lorenz, LLP (57) ABSTRACT

Vehicle systems and methods are provided for updating vehicle systems in response to an update event at one of the vehicle systems, such as, for example, an update at a flight management system (FMS) of an aircraft. One method involves the FMS obtaining event data from an external source indicative of an update event, updating flight data at the FMS to an updated state based at least in part on the event data, and then adding the event data to an event queue after updating the flight data at the FMS to the updated state. One or more other vehicle systems can asynchronously retrieve the event data from the event queue and independently update in response to the event data.

20 Claims, 4 Drawing Sheets

(56) References Cited

U.S. PATENT DOCUMENTS

2022/0207055 A1\* 6/2022 Plantinga ............ G06F 21/6218
2022/0343772 A1\* 10/2022 Schwindt ................. G08G 5/34

FOREIGN PATENT DOCUMENTS

| EP | 3719777 A1 | 10/2020 |
| EP | 3757969 A1 | 12/2020 |
| FR | 2992445 A1 | 12/2013 |
| FR | 3092411 A1 | 8/2020 |

\* cited by examiner

VEHICLE SYSTEMS AND METHODS FOR NONSYNCHRONOUS REDUNDANCY MANAGEMENT

CROSS REFERENCE TO RELATED APPLICATION

This application claims priority to India Provisional Patent Application No. 202311050000, filed Jul. 25, 2023, the entire content of which is incorporated by reference herein.

TECHNICAL FIELD

The subject matter described herein relates generally to vehicle systems, and more particularly, embodiments of the subject matter relate to aircraft systems with nonsynchronous and independent redundancy management.

BACKGROUND

Modern vehicles, and in particular, manned aircraft often employ redundancy to ensure they are fail operational. Additionally, data or states may be compared across redundant systems to verify or otherwise validate that the systems are performing correctly as intended. However, existing systems typically require undesirable amounts of data transfer and/or complex synchronization schemes to maintain operation of redundant systems substantially in lockstep. Accordingly, it is desirable to provide methods and systems for synchronization of data or states across distinct or disparate systems that minimize data transfer or bandwidth requirements without requiring complex synchronization schemes. Other desirable features and characteristics will become apparent from the subsequent detailed description and the appended claims, taken in conjunction with the accompanying drawings and this background.

BRIEF SUMMARY

Vehicle systems and methods are provided for updating data at different vehicle systems for redundancy. One method involves obtaining, at a first computing system associated with a vehicle, event data from an external source indicative of an update event at the first computing system, updating, at the first computing system, vehicle data at the first computing system to an updated state based at least in part on the event data, and after updating the vehicle data at the first computing system to the updated state, adding the event data to an event queue coupled to the vehicle system. In an example implementation, where the vehicle is an aircraft, the first computing system is a primary flight management system (FMS), where the second computing system is realized as a secondary FMS, an electronic flight bag (EFB) system or another avionics system.

An aircraft system is provided that includes a source of event data indicative of an update event, a data storage element to maintain an event queue, and a flight management system (FMS) coupled to the source of the event data and the data storage element to obtain the event data indicative of the update event, update flight data at the FMS to an updated state based at least in part on the event data, and after updating the flight data to the updated state, writing the event data to the event queue.

An apparatus for a non-transitory computer-readable medium is also provided. The computer-readable medium has computer-executable instructions stored thereon that, when executed by a processing system associated with a vehicle system associated with a vehicle, cause the processing system to obtain event data from an external source indicative of an update event, update vehicle data at the vehicle system to an updated state based at least in part on the event data, and add the event data to an event queue coupled to a second vehicle system after updating the vehicle data at the vehicle system to the updated state.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF DRAWINGS

Exemplary embodiments of the subject matter of the present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to systems and methods for effectively synchronizing updates at different computing systems associated with a vehicle in response to event data received from an external or disparate source that triggers or otherwise initiates an update event, such as, for example, a user input, an automated event generated by another computing system onboard the vehicle, and/or the like. A first computing system, which may alternatively be referred to herein as the primary or master computing system, updates vehicle data from its current state to an updated state in response to the event data for the update event, and then after updating the vehicle data at the first computing system to the updated state, adds the event data for the update event to an event queue that is coupled to another vehicle system. In this regard, the primary computing system may validate the update state of the vehicle data at the primary computing system prior to adding the event data to the event queue, such that invalid event data or event data that otherwise results in an invalid state is not propagated to additional systems.

In some implementations, the primary computing system validates the updated state of the vehicle data at the primary computing system matches the current state of the vehicle data maintained at another computing system, such as a redundant instance of the first computing system, prior to adding the event data to the event queue. For example, the first computing system may be designated as a master or primary flight management system (FMS) associated with an aircraft, where in response to receiving event data for an update event, the primary FMS updates the state of the aircraft data maintained at the primary FMS and then validates the updated state of the aircraft data matches the current state of the aircraft data at a slave or secondary FMS before adding the event data to the event queue. In this regard, similar to the primary FMS, the secondary FMS may be configurable to receive the event data for the update event and update the aircraft data at the secondary FMS independent of the primary FMS. In such implementations, after validating the updated state of the aircraft data maintained at the primary FMS matches the current state of the aircraft data at the secondary FMS, the primary FMS adds the event data to the event queue for subsequent processing and/or handling by one or more other vehicle systems.

For example, an electronic flight bag (EFB) system or other auxiliary computing system that includes or otherwise incorporates flight management functionality may be configurable to periodically poll the event queue to obtain event data and perform corresponding updates at the EFB system or other system responsive to the event data to reflect the update event. In this manner, the resulting state of the EFB system or other system(s) coupled to the event queue may be capable of updating and responding to an update event from an external source independently of the primary FMS. In this manner, each distinct or disparate system may independently maintain and update its own state responsive to an update event, while maintaining consistent and common states across the different systems in response to an update event without requiring complex synchronization schemes. In this regard, it should be noted that the different systems can process the event data for updates independently of one another, on their own schedule, while maintaining processing of the event data in the same sequence or order. Additionally, data transfer between systems can be minimized by merely transmitting the event data (e.g., the primary FMS does not need to add any additional FMS-computed data to the event queue). In this regard, the event data transferred from a primary FMS to an EFB system, a secondary FMS, or other external system does not include data or information that was calculated or computed by the primary FMS, but rather, may be limited to the data, metadata or other information characterizing the event.

For example, a user input event like a pilot or other crew member changing a cruise altitude may cause the primary FMS to dynamically updated the entirety of the remainder of the active flight plan or predictions based thereon, however, the event data written to the event queue may include only the data or metadata for defining the changed cruise altitude associated with the user input event without any additional data or information that may have been subsequently computed by the primary FMS. In such scenarios, the EFB system, secondary FMS, or other external system utilizes the transferred event data to independently update the active flight plan or perform other computations influenced by the active flight plan or the changed cruise altitude without reliance on any additional calculated or computed data from the primary FMS. In a similar manner, for automated or FMS generated events, such as a flight phase change event or navigational leg sequence change event automatically generated by the primary FMS based on navigational data from an onboard navigational system, the primary FMS merely writes the event data characterizing the event (e.g., data, metadata or other indicia of the change) to the event queue, such that the EFB system, secondary FMS, or other external system performs independent computations or updates at the respective system using the event data without reliance on any additional calculated or computed data from the primary FMS.

For purposes of explanation, the subject matter may be described herein primarily in the context of a primary FMS onboard an aircraft operating in concert with one or more other FMSs, EFBs and/or other avionics systems in an aviation context. However, it should be understood that the subject matter described herein is not necessarily limited to use with aircraft or other vehicle systems or applications and may be similarly utilized in other application, systems or environments, including, but not limited to use with other types of vehicles (e.g., automobiles, marine vessels, trains, etc.).

Figure 1:
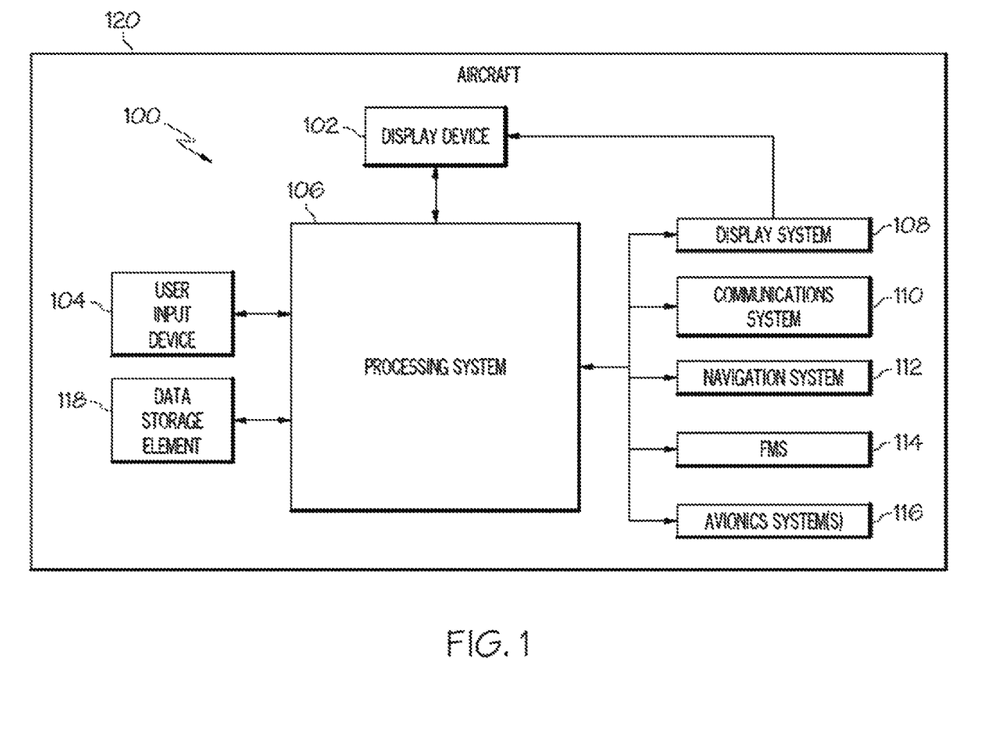
FIG. 1 is a block diagram of a system for an aircraft in accordance with one or more exemplary embodiments.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, an airport database, a terminal airspace database, a special use airspace database, or other information for rendering and/or displaying navigational maps and/or other content on the display device 102.

In the illustrated embodiment, the aircraft system 100 includes a data storage element 118, which is capable of storing, maintaining or otherwise implementing one or more of the databases that support operations of the aircraft system 100 described herein. In some embodiments, the data storage element 118 contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information includes instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
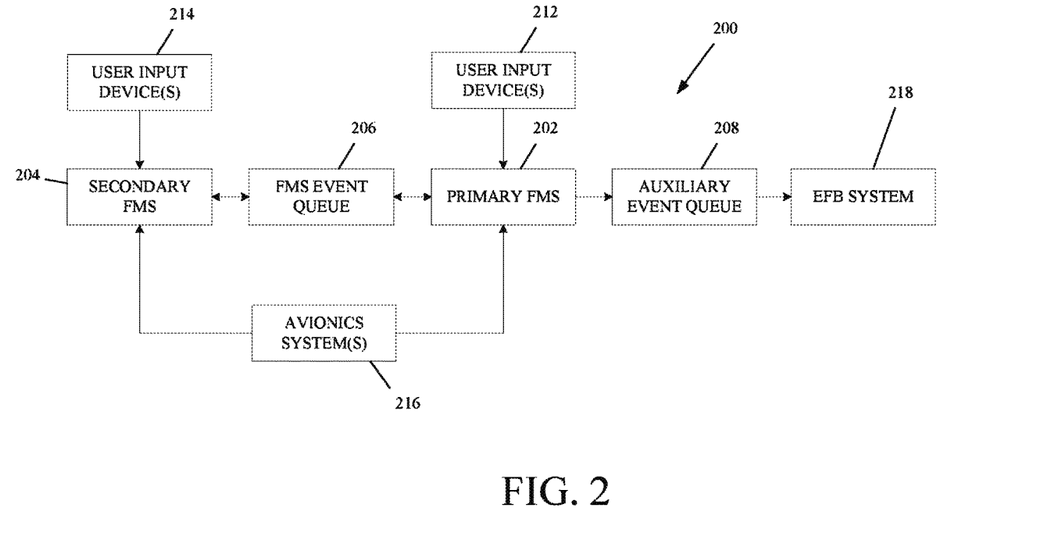
FIG. 2 depicts an exemplary system suitable for use with the aircraft system of FIG. 1 in one or more exemplary embodiments.

FIG. 2 depicts an exemplary embodiment of a system 200 suitable for use with a vehicle system (e.g., aircraft system 100 of FIG. 1) that includes redundant FMSs 202, 204 (e.g., redundant instances of FMS 114) that are configurable to effectively synchronize updates at the different FMSs 202, 204 in response to event data received from an external or disparate source, such as a user input device 212, 214 (e.g., one or more of the user input devices 104 of the system 100 of FIG. 1) or another avionics system 216 (e.g., one or more of the avionics systems 108, 110, 112, 114, 116 in the system 100 of FIG. 1), utilizing a common event queue 206 shared between the FMSs 202, 204. For purposes of explanation, the first FMS 202 that functions as the master or primary may alternatively be referred to herein as the primary FMS 202, while the second FMS 204 that functions as the backup, hot spare, failover or slave may alternatively be referred to herein as the secondary FMS 204. In this regard, in exemplary implementations, the hardware, firmware and/or software components of the primary FMS 202 and the secondary FMS 204 may be substantially identical.

As described in greater detail below, the primary FMS 202 obtains event data corresponding to an update event from the event queue 206, updates the current state of the flight data or other data pertaining to the operation of the aircraft at the primary FMS 202, and then after updating the flight data or other aircraft data at the primary FMS 202 to an updated state responsive to the event data, the primary FMS 202 writes, stores or otherwise provides the event data to another event queue 208 that is accessible to one or more additional avionics systems 218, such as, for example, an EFB system. In a similar manner, the secondary FMS 204 independently obtains and processes the event data from the event queue 206 to update the flight data or other aircraft data maintained at the secondary FMS 204, while the additional avionics system(s) 218 obtains and processes event data from the other event queue 208 to update the state of the data maintained at the avionic(s) system 218. As a result, the respective states of the different systems 202, 204, 218 are updated independently in response to an update event, but the updated states of the different systems 202, 204, 218 are effectively synchronized to the same update event without requiring complex synchronization schemes or data transfer between the systems 202, 204, 218 other than the event data transferred to/from the event queues 206, 208. For purposes of explanation, and without limitation, the event queue 206 common to both FMSs 202, 204 may alternatively be referred to as the FMS event queue 206 while the other event queue 208 may alternatively be referred to herein as an auxiliary event queue 208. Additionally, for purposes of explanation, the subject matter may be described herein in the context of the avionics system 218 being realized as an EFB system 218; however, it should be appreciated that the subject matter described herein is not limited to any particular type, number or configuration of avionics systems or other computing systems that may be updated using the event queue 208.

The event queues 206, 208 generally represent the data storage elements or other non-transitory computer-readable media of the system 200 that is capable of buffering or otherwise maintaining event data in a sequential manner. For example, in some implementations, one or more of the event queues 206, 208 may be configured as a first-in, first out (FIFO) buffer, where event data is evicted, removed or overwritten at some point in time after being processed by a respective computing system subscribed to the respective event queue 206, 208. That said, it should be appreciated that the subject matter described herein is not necessarily limited to any particular type or configuration of event queues 206, 208.

Figure 3:
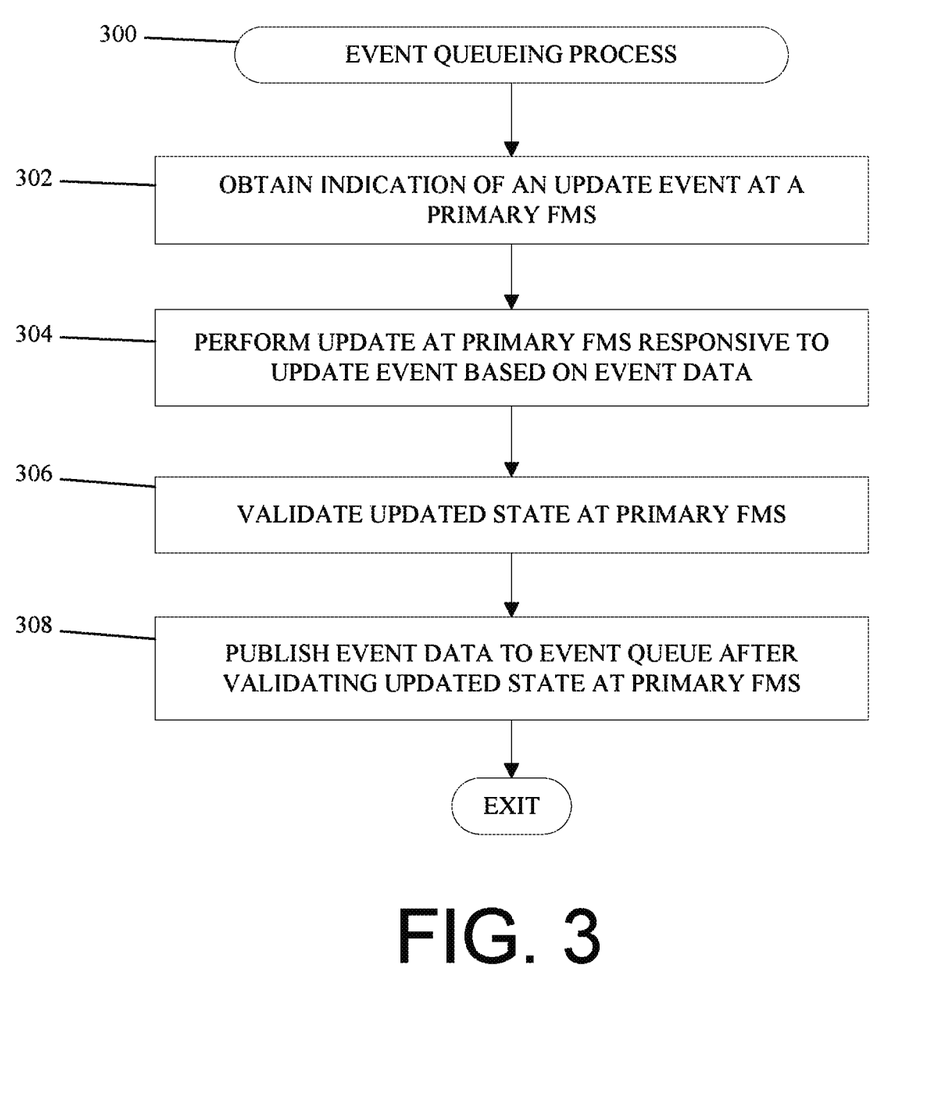
FIG. 3 is a flow diagram of an event queueing process suitable for implementation in connection with the system of FIG. 2 in an exemplary embodiment.

FIG. 3 depicts an exemplary embodiment of an event queueing process 300 suitable for implementation in a vehicle system to effectively synchronize event-driven updates and the resulting updated states of different computing systems to reflect the same sequence of events and corresponding event data. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the event queueing process 300 may be performed by different elements of a vehicle system. That said, exemplary embodiments are described herein in the context of the event queueing process 300 being primarily performed by an event updating service at a primary FMS 202 onboard an aircraft. It should be appreciated that the event queueing process 300 may include any number of additional or alternative tasks, the tasks need not be performed in the illustrated order and/or the tasks may be performed concurrently, and/or the event queueing process 300 may be incorporated into a more comprehensive procedure or process having additional functionality not described in detail herein. Moreover, one or more of the tasks shown and described in the context of FIG. 3 could be omitted from a practical embodiment of the event queueing process 300 as long as the intended overall functionality remains intact.

Referring to FIG. 3 with continued reference to FIGS. 1-2, the event queueing process 300 is initiated or otherwise performed in response to receiving or otherwise obtaining indication of an updating event at a primary computing system (task 302), such as the primary FMS 202. In exemplary implementations, an event updating service at the primary FMS 202 periodically polls or otherwise monitors the FMS event queue 206 for event data indicative of an event that triggers a corresponding update at the primary FMS 202. Depending on the implementation, the update event and corresponding event data may be manually provided by a user input device 212 associated with the primary FMS 202 (e.g., in response to a pilot or other user inputting information to alter a flight plan or other aspect of operation of the aircraft), automatically generated by an avionics system 216 coupled to the primary FMS 202 (e.g., in response to a navigation system providing indication of a current location of an aircraft traversing a waypoint or other navigational reference point associated with a flight plan, an avionics system indicating a change to a configuration of the aircraft, and/or the like). In response to receiving or otherwise identifying data indicative of an update to be performed at the primary FMS 202, the primary FMS 202 writes, adds or otherwise provides the event data for the update event to the FMS event queue 206 for sequencing and subsequent handling. In this regard, in addition to updates triggered by or at an external source 212, 216 to the primary FMS 202, the FMS event queue 206 may also maintain event data for an update event for updates triggered by the secondary FMS 204 or other user input devices 214 that are indirectly coupled to the primary FMS 202. For example, in a similar manner, in response to the secondary FMS 204 receiving or otherwise identifying data indicative of an update event to be performed at the secondary FMS 204, the secondary FMS 204 writes, adds or otherwise provides the event data for the update event to the FMS event queue 206 for sequencing and subsequent handling. Thus, the FMS event queue 206 maintains event data for different updates to be performed at the respective FMSs 202, 204 responsive to events generated or triggered by any sort of external source 212, 214, 216.

After obtaining indication of an event triggering an update at the primary computing system, the event queueing process 300 continues by processing the event data to perform the update at the primary computing system (task 304). In this regard, when the event updating service at the primary FMS 202 identifies event data in the FMS event queue 206 indicative of an event that should trigger a corresponding update at the primary FMS 202 which has not yet been performed, the event updating service retrieves or otherwise obtains the event data for the update event from the FMS event queue 206 and provides the event data to the corresponding software, algorithm(s) or other processing logic at the primary FMS 202 that is configured to process or otherwise execute the event data to produce a corresponding update to the state of the flight data or other aircraft data maintained at the primary FMS 202. For example, in response to event data corresponding to user input received from a user input device 212, 214 to add a waypoint to a flight plan for the aircraft, the event updating service provides the event data including information pertaining to the waypoint to be added to a flight planning service or component of the primary FMS 202 to update the flight plan for the aircraft to include the newly added waypoint. As another example, in response to event data corresponding to navigational data received from a navigation system 216 that indicates the aircraft has traversed a particular waypoint of the current flight plan for the aircraft, the event updating service may similarly provide the event data including information pertaining to the current state of the aircraft within the context of the flight plan to a flight planning service or other component of the primary FMS 202 to correspondingly update data maintained at the primary FMS 202 to reflect the aircraft's current state or location within the flight plan as having traversed the respective waypoint.

Still referring to FIG. 3, in one or more implementations, the event queueing process 300 validates or otherwise confirms the updated state of the data at the primary computing system after processing the event data for the event update prior to publishing the event data to another event queue for propagating the update event to other computing systems (tasks 306, 308). For example, the primary FMS 202 may validate or otherwise confirm that the event data does not include invalid values and that the resulting updated state of the flight data or other aircraft data maintained at the primary FMS 202 after processing the event data is valid, and does not include any invalid values or state information, prior to publishing the event data to the auxiliary event queue 208. In some implementations, the primary FMS 202 may validate or otherwise confirm that the secondary FMS 204 has processed the event data and that the current, updated state of the flight data or other aircraft data maintained at the primary FMS 202 matches the current state of the flight data or other aircraft data maintained at the secondary FMS 204 prior to publishing the event data to the auxiliary event queue 208. In this manner, when the event data includes invalid data or information or would otherwise result in an invalid or unpermitted state at the primary FMS 202, the primary FMS 202 prevents the event data from being propagated to the EFB system 218 or other avionics system(s) that may be subscribed to the auxiliary event queue 208.

After validating the event data and the resulting updated state at the primary FMS 202, the primary FMS 202 writes, adds or otherwise provides the event data for the update event to the auxiliary event queue 208 for subsequent processing by the EFB system 218 or other downstream avionics system(s). In this regard, the primary FMS 202 adds event data for the update events that have already occurred or been performed at the primary FMS 202 to the auxiliary event queue 208 in the same sequence or order as those update events were performed at the primary FMS 202, such that the EFB system 218 or other downstream avionics system(s) may correspondingly process and update their respective states in response to those same update events in the same sequence or order as those events occurred at the FMSs 202, 204.

In a similar manner as described above in the context of the primary FMS 202, an event updating service at the EFB system 218 periodically polls or otherwise monitors the auxiliary event queue 208 for event data indicative of an event that triggered an update at the primary FMS 202. When the event updating service at the EFB system 218 identifies event data in the auxiliary event queue 208 indicative of an update event at the primary FMS 202, the event updating service retrieves or otherwise obtains the event data for the update event from the auxiliary event queue 208 and provides the event data to the corresponding software, algorithm(s) or other processing logic at the EFB system 218 that is configured to process or otherwise execute the event data to correspondingly update to the state of the data maintained at the EFB system 218 to reflect the update event and/or the updated state of the primary FMS 202. In this manner, the auxiliary event queue 208 can be utilized to effectively synchronize the state of the EFB system 218 or other avionics systems to the current state of the primary FMS 202 in response to event-triggered or event-driven updates at the primary FMS 202 while ensuring event processing occurs in the same sequence or order without requiring any additional synchronization schemes. Additionally, the primary FMS 202 merely provides the event data to the auxiliary event queue 208, rather than transferring updated state data or information from the primary FMS 202, thereby reducing the amount of data transfer and corresponding memory, bandwidth, processing and/or latency that a larger data transfer could otherwise entail.

Figure 4:
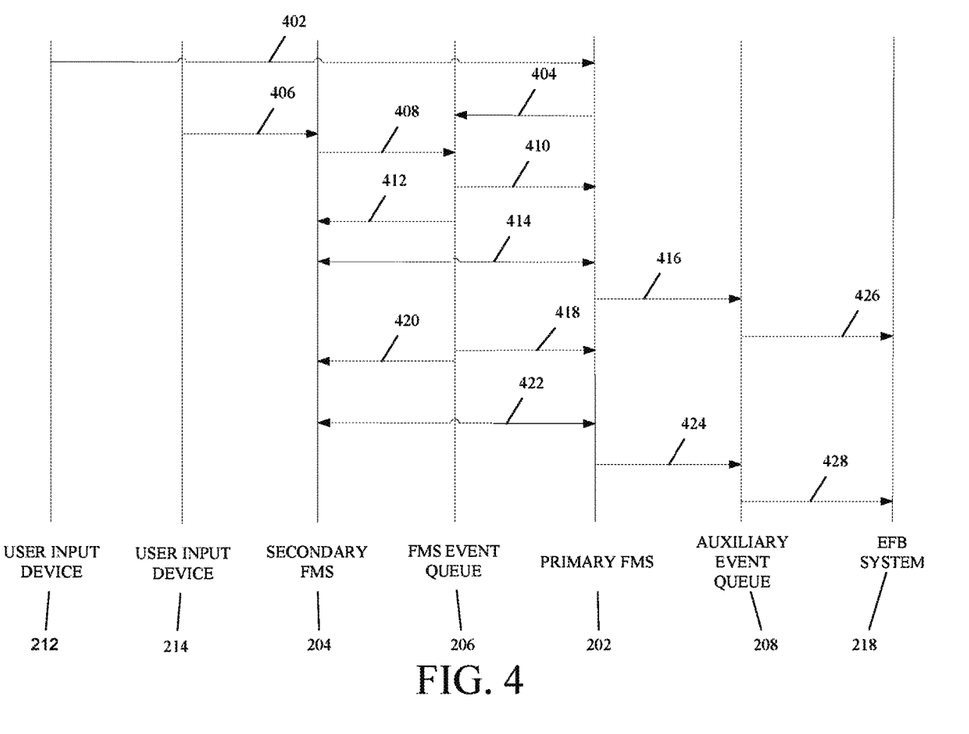
FIG. 4 depicts an exemplary sequence of communications within the system of FIG. 2 in connection with one or more exemplary implementations of the event queueing process of FIG. 3.

FIG. 4 depicts an exemplary sequence 400 of communications within the system 200 of FIG. 2 in connection with one or more exemplary implementations of the event queueing process 300 of FIG. 3. The illustrated sequence 400 begins in response to a pilot or other user manipulating the user input device 212 to interact with the primary FMS 202 to manually input or otherwise provide user input data 402 that triggers or otherwise initiates an update at the primary FMS 202, such as, for example, the modification, addition or removal of a waypoint of the current or active flight plan for the aircraft, entering or modifying a speed constraint associated with a waypoint of the current or active flight plan, entering or modifying an altitude constraint associated with a waypoint of the current or active flight plan, modifying the cost index to be utilized by the FMS 202 when implementing a flight plan, or any other sort of crew-initiated or user-initiated flight plan change event. In response to the software, algorithm(s) or other processing logic at the primary FMS 202 determining the user input data 402 triggers, initiates or otherwise requires an update to be performed, an event updating service at the primary FMS 202 may write, store or otherwise provide event data 404 corresponding to the received user input data 402 to the FMS event queue 206. In this regard, the event data 404 may include at least a subset of the user input data 402 that is required for updating the state of the flight plan or other flight data at the primary FMS 202.

The illustrated sequence 400 depicts a scenario where a co-pilot or other user may concurrently manipulate another user input device 214 to interact with the secondary FMS 204 to manually input or otherwise provide different user input data 406 responsive to the pilot behavior that would otherwise trigger or otherwise initiate an update at the secondary FMS 204, such as, for example, modifying one or more configurations or settings associated with another avionics system onboard the aircraft. In response to determining the user input data 406 triggers, initiates or otherwise requires an update to be performed, an event updating service at the secondary FMS 204 may similarly write, store or otherwise provide second event data 408 corresponding to the received user input data 406 to the FMS event queue 206.

In this regard, by virtue of the FMS event queue 206 being configured as a FIFO buffer, the first event data 404 and the second event data 408 are maintained in a sequential order according to when the respective events occurred at the respective FMSs 202, 204.

As described above, the event updating service at the primary FMS 202 periodically polls or otherwise monitors the FMS event queue 206 to retrieve or otherwise obtain event data 410 from the FMS event queue 206 in accordance with the respective sequence or order of the event data maintained at the FMS event queue 206. Thus, the FMS event queue 206 ensures that the primary FMS 202 initially updates its state to reflect the first update triggered by the received user input data 402 from the pilot prior to subsequently updating its state to reflect the next successive update triggered by the subsequently received user input data 406 from the co-pilot. The illustrated implementation in FIG. 4 depicts an implementation where the secondary FMS 204 is similarly configured to retrieve or otherwise obtain the event data 412 from the FMS event queue 206 that corresponds to the user input data 402 received from the pilot prior to the subsequent user input data 406 received at the secondary FMS 204. That said, in other implementations, the secondary FMS 204 may be configured to receive the user input data 402 received from the pilot from the primary FMS 202 after the primary FMS 202 retrieves the event data 410 from the FMS event queue 206, for example, in implementations where the primary FMS 202 imposes or otherwise implements another scheme to maintain identical states of the primary and secondary FMSs 202, 204 after each event-driven update.

In the illustrated implementation, after the software, algorithm(s) or other processing logic at the primary FMS 202 processes the retrieved event data 410 to update the state of the flight plan or other flight data maintained at the primary FMS 202 to reflect the update event resulting from the received user input data 402, the primary FMS 202 communicates with the secondary FMS 204 to verify, confirm or otherwise validate that the current updated state of the flight plan or other flight data maintained at the primary FMS 202 matches the current state of the flight plan or other flight data maintained at the secondary FMS 204. For example, in implementations where both FMSs 202, 204 independently process event data, the primary FMS 202 may verify or otherwise validate the updated states of the FMSs 202, 204 before proceeding to the next event update to ensure that the values, data or other information maintained at both of the FMSs 202, 204 are valid and consistent with one another.

After updating and validating the state of the flight plan or other flight data maintained at the primary FMS 202, the event updating service at the primary FMS 202 writes, stores or otherwise provides the event data 416 corresponding to the received user input data 402 to the auxiliary event queue 208. Thereafter, the event updating service at the primary FMS 202 retrieves or otherwise obtains event data 418 from the FMS event queue 206 that corresponds to the next update event according to the sequence of event data maintained at the FMS event queue 206. Thus, after updating the state of the flight data or other information at the primary FMS 202 to reflect the user input data 402 received from the pilot, the primary FMS 202 may be further updated from the current updated state to reflect the subsequent user input data 406 received from the co-pilot at the secondary FMS 204. In a similar manner as described above, the secondary FMS 204 similarly receives the event data 420 corresponding to the next update event and independently updates the state of the flight data or information at the secondary FMS 204 substantially concurrent to the updating at the primary FMS 202. Thereafter, in the illustrated sequence 400, the primary FMS 202 communicates with the secondary FMS 204 to validate 422 the updated state of the primary FMS 202 and current state of the secondary FMS 204 match prior to writing the event data 424 to the auxiliary event queue 208.

By virtue of the auxiliary event queue 208 being configured as a FIFO buffer, the event data received 416, 424 from the primary FMS 202 is maintained in a sequential order in accordance with when the respective events were processed at the primary FMS 202, thereby allowing the EFB system 218 or other avionics system(s) utilizing the auxiliary event queue 208 to perform event-driven updates independently yet substantially in lockstep with the primary FMS 202 without requiring any synchronization or other communications to/from the primary FMS 202. In this regard, the EFB system 218 may asynchronously monitor or poll the auxiliary event queue 208 to identify new instances of event data corresponding to update events at the primary FMS 202 and sequentially process the event data in the same order as the update events occurred at the primary FMS 202, such that the resulting updated state of the data or information maintained at the EFB system 218 corresponds to the current state of the flight data or other information maintained at primary FMS 202 substantially in real-time. For example, the EFB system 218 may include software that is configurable to support new, modern, upgraded, or enhanced flight management functionality, flight visualizations, analytics, or other features that are not implemented at or supported by the primary FMS 202. In this manner, the auxiliary event queue 208 is utilized to transfer event data to the EFB system 218 to support the functionality and/or features implemented at the EFB system 218 and independently and asynchronously update the state of the EFB system 218 in an event-driven manner in the same order as the primary FMS 202, thereby maintaining the concurrent relationship between the current state of the flight data at the EFB system 218 and the current state of the flight data at the primary FMS 202 without requiring complex synchronization schemes or other communications between the primary FMS 202 and the EFB system 218.

For example, an event updating service at the EFB system 218 may retrieve the event data 426 corresponding to the user input data 402 retrieved from the pilot user input device 212 to update the state of the flight data or information at the EFB system 218 to reflect the user input received from the pilot and correspond to the updated state of the primary FMS 202 resulting from the received pilot input. Thereafter, the EFB system 218 retrieves the event data 428 corresponding to the user input data 406 retrieved from the co-pilot user input device 214 to update the state of the flight data or information at the EFB system 218 to reflect the user input received from the co-pilot and correspond to the updated state of the primary FMS 202 that reflects both the pilot user input and the co-pilot user input in accordance with the order in which the respective user inputs were received. In this manner, the event queueing process 300 maintains coherent and concurrent relationships between the state of the primary FMS 202, the state of the secondary FMS 204, the EFB system 218 and/or any other avionics systems coupled to the auxiliary event queue 208 without requiring complex synchronization or other data transfer between disparate or distinct systems beyond transferring event data to/from the respective event queues 206, 208.

It should be noted that although FIG. 4 is described in the context of user input, the event queueing process 300 may function in an equivalent manner in the context of update events that are automatically triggered or generated by changes to the aircraft operating state information or other contextual information provided by one or more avionics systems 108, 110, 112, 114, 116, 216. For example, in response to a change in the current location and/or altitude of the aircraft 120 indicated by the navigation system 112, 216, one of the primary FMS 202 or the secondary FMS 204 may automatically generate or otherwise trigger an update event and write the corresponding event data to the FMS event queue 206 that includes the relevant navigational information associated with the aircraft 120 obtained from the navigation system 112, 216 that triggered the event. After updating the primary FMS 202 responsive to the change to the aircraft location or other operational context, the primary FMS 202 writes the event data including the values, data or other information for the aircraft parameters that triggered the update event that were previously obtained from the avionics system(s) 108, 110, 112, 114, 116, 216 to the auxiliary event queue 208, thereby transferring the relevant event data to the EFB system 218 or other external system for asynchronously updating in response to the change in the aircraft state.

By virtue of the subject matter described herein, asynchronous event-driven updates can occur at different or disparate systems substantially concurrently while allowing the respective systems to process the event data independently from one another without complex synchronization schemes or other overhead associated with ensuring concurrent operations. In this regard, the event data processing and corresponding updates at the different systems is not necessarily required to be performed simultaneously or concurrently, but the same sequence or ordering of events is preserved across systems, such that the resulting updated states of the different systems maintain coherent and concurrent relationships with one another after updating, that is, each system ultimately reflects the occurrence of the same sequence of events in the same order. Moreover, the amount of data transferred between systems can be limited to the event data, which reduces latency as well as memory and bandwidth requirements.

For the sake of brevity, conventional techniques related to avionics systems, FMSs, flight planning, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of updating a vehicle system associated with an aircraft, the method comprising:
    obtaining, at a flight management system (FMS) associated with the aircraft, event data from an external source indicative of an update event at the FMS;
    updating, at the FMS, flight data at the FMS to an updated state based at least in part on the event data; and
    after updating the flight data at the FMS to the updated state, adding the event data to an event queue coupled to the vehicle system.

2. The method of claim 1, further comprising validating the updated state of the flight data at the FMS prior to adding the event data to the event queue.

3. The method of claim 2, wherein validating the updated state comprises validating the updated state of the flight data at the FMS matches a second updated state of the flight data maintained at a second computing system, wherein the second updated state of the flight data is determined at the second computing system based at least in part on the event data.

4. The method of claim 3, wherein the second computing system comprises a secondary FMS.

5. The method of claim 4, further comprising validating, at the FMS, the updated state of the flight data at the FMS matches a current state of flight data at the secondary FMS prior to adding the event data to the event queue.

6. The method of 4, wherein the vehicle system comprises an electronic flight bag (EFB) system configurable to asynchronously retrieve the event data from the event queue and independently update a state of the EFB system in response to the event data.

7. The method of claim 1, further comprising:
    receiving, at the FMS, user input data indicative of the update event from a user input device; and
    writing, by the FMS, the event data comprising a subset of the user input data to a second event queue, wherein:
        obtaining the event data comprises obtaining the event data comprising the subset of the user input data from the second event queue; and
        adding the event data to the event queue comprises writing the event data comprising the subset of the user input data to the event queue after updating the flight data at the FMS to the updated state based at least in part on the subset of the user input data obtained from the second event queue.

8. The method of claim 1, further comprising:
    obtaining, at the FMS, vehicle state data indicative of a current operating context of the aircraft from one or more systems onboard the aircraft;
    determining, at the FMS, the update event to occur based at least in part on the state data; and
    writing, by the FMS, the event data comprising a subset of the state data to a second event queue, wherein:
        obtaining the event data comprises obtaining the event data comprising the subset of the state data from the second event queue; and
        adding the event data to the event queue comprises writing the event data comprising the subset of the state data to the event queue after updating the flight data at the FMS to the updated state based at least in part on the subset of the state data obtained from the second event queue.

9. An aircraft system comprising:
    a source of event data indicative of an update event;
    a data storage element to maintain an event queue; and
    a flight management system (FMS) coupled to the source of the event data and the data storage element to obtain the event data indicative of the update event, update flight data at the FMS to an updated state based at least in part on the event data, and after updating the flight data to the updated state, write the event data to the event queue.

10. The aircraft system of claim 9, further comprising an electronic flight bag (EFB) system coupled to the data storage element, wherein the EFB system is configurable to asynchronously retrieve the event data from the event queue and independently update a state of the EFB system in response to the event data.

11. The aircraft system of claim 9, wherein the source comprises a user input device to receive user input data indicative of a modification to a flight plan, wherein:
    the event data comprises at least a subset of the user input data; and
    the FMS is coupled to the user input device configurable to update the flight plan at the FMS to the updated state reflecting the modification and write the event data comprising at least the subset of the user input data to the event queue after updating the flight plan at the FMS.

12. The aircraft system of claim 11, further comprising a second data storage element to maintain a second event queue, wherein prior to updating the flight plan at the FMS, the FMS is configurable to write the event data comprising at least the subset of the user input data to the second event queue and obtain the event data comprising at least the subset of the user input data from the second event queue.

13. The aircraft system of claim 12, further comprising a secondary FMS coupled to the second data storage element to obtain the event data comprising at least the subset of the user input data from the second event queue and update the flight plan at the secondary FMS to a second updated state reflecting the modification, wherein the FMS is configurable to validate the second updated state of the flight plan at the secondary FMS matches the updated state of the flight plan at the FMS prior to writing the event data comprising at least the subset of the user input data to the event queue.

14. The aircraft system of claim 9, wherein the source comprises an avionics system to provide aircraft state information indicative of the update event, wherein:
the event data comprises at least a subset of the aircraft state information; and
the FMS is configurable to update the flight data at the FMS to the updated state reflecting the subset of the aircraft state information and write the event data comprising at least the subset of the aircraft state information to the event queue after updating the flight data at the FMS.

15. The aircraft system of claim 14, further comprising a second data storage element to maintain a second event queue, wherein prior to updating the flight data at the FMS, the FMS is configurable to write the event data comprising at least the subset of the aircraft state information to the second event queue and obtain the event data comprising at least the subset of the aircraft state information from the second event queue.

16. The aircraft system of claim 15, further comprising a secondary FMS coupled to the second data storage element to obtain the event data comprising at least the subset of the aircraft state information from the second event queue and update the flight data at the secondary FMS to a second updated state reflecting the subset of the aircraft state information, wherein the FMS is configurable to validate the second updated state of the flight data at the secondary FMS matches the updated state of the flight data at the FMS prior to writing the event data comprising at least the subset of the aircraft state information to the event queue.

17. A computer-readable medium having computer-executable instructions stored thereon that, when executed by a processing system associated with a flight management system (FMS) associated with an aircraft, cause the processing system to:
obtain event data from an external source indicative of an update event;
update flight data at the FMS to an updated state based at least in part on the event data; and
add the event data to an event queue coupled to a second vehicle system after updating the flight data at the FMS to the updated state.

18. The computer-readable medium of claim 17, wherein the instructions are configurable to cause the processing system to:
receive user input data indicative of the update event from a user input device;
write the event data comprising a subset of the user input data to a second event queue;
obtain the event data comprising the subset of the user input data from the second event queue; and
write the event data comprising the subset of the user input data to the event queue after updating the flight data at the FMS to the updated state based at least in part on the subset of the user input data obtained from the second event queue.

19. The computer-readable medium of claim 17, wherein the instructions are configurable to cause the processing system to:
obtain aircraft state data indicative of a current operating state of the aircraft from one or more avionics systems onboard the aircraft;
determine the update event to occur based at least in part on the aircraft state data;
write the event data comprising a subset of the aircraft state data to a second event queue;
obtain the event data comprising the subset of the aircraft state data from the second event queue; and
write the event data comprising the subset of the aircraft state data to the event queue after updating the flight data at the FMS to the updated state based at least in part on the subset of the aircraft state data obtained from the second event queue.

20. The computer-readable medium of claim 17, wherein:
the instructions are configurable to cause the processing system to validate the updated state of the flight data at the FMS matches a second updated state of the flight data at a secondary FMS associated with the aircraft responsive to the event data prior to adding the event data to the event queue; and
the second vehicle system comprises an electronic flight bag (EFB) system configurable to asynchronously retrieve the event data from the event queue and independently update a state of the EFB system in response to the event data.

* * * * *